United States Patent
Kendrick et al.

(10) Patent No.: US 7,352,470 B1
(45) Date of Patent: Apr. 1, 2008

(54) FOURIER TRANSFORM SPECTROMETRY WITH A SINGLE-APERTURE INTERFEROMETER

(75) Inventors: Richard Lee Kendrick, Foster City, CA (US); Eric H. Smith, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 485 days.

(21) Appl. No.: 11/066,384

(22) Filed: Feb. 28, 2005

Related U.S. Application Data

(63) Continuation-in-part of application No. 10/627,404, filed on Jul. 25, 2003, now Pat. No. 7,034,945.

(60) Provisional application No. 60/572,769, filed on May 21, 2004, provisional application No. 60/398,611, filed on Jul. 26, 2002.

(51) Int. Cl.
*G01J 3/45* (2006.01)
*G01B 9/02* (2006.01)

(52) U.S. Cl. .................................................... 356/456
(58) Field of Classification Search ................ 356/451, 356/456; 250/339.07, 339.08
See application file for complete search history.

(56) References Cited

U.S. PATENT DOCUMENTS

| 4,136,954 A | | 1/1979 | Jamieson |
| 4,856,884 A | | 8/1989 | Fender et al. |
| 5,367,375 A | * | 11/1994 | Siebert ........................ 356/520 |
| 5,404,221 A | | 4/1995 | De Groot |
| 5,610,707 A | | 3/1997 | Duncan et al. |
| 5,828,066 A | * | 10/1998 | Messerschmidt ....... 250/339.07 |
| 5,905,591 A | | 5/1999 | Duncan et al. |
| 7,034,945 B2 | * | 4/2006 | Kendrick et al. ........... 356/456 |
| 7,092,103 B1 | | 8/2006 | Kendrick et al. |
| 7,161,128 B2 | * | 1/2007 | Wirth ..................... 250/201.9 |

OTHER PUBLICATIONS

FFT Windowing. http://www.daqarta.com/ww00wndo.htm, pp. 1-8, printed Jul. 3, 2003.
Felgett, Spectrometre Interferentiel Multiplex Pour Mesures Infrarouges Sur Les Etoiles, Les Editions de Physique, Reprinted with permission from Le Journal de Physice et le Radium, vol. 19, 237-240, Mar. 1958.
Kendrick, et al., Imaging Fourier Transform Spectrometry with a Fizeau Interferometer, Proceedings of SPIE Reprint, reprinted from Interferometry in Space, Aug. 2002, Waikoloa, Hawaii.
Zarifis, et al., The Multi Aperture Imaging Array, Optical and IR Interferometry from Ground and Space, ASP Conference Series, vol. 194, 1999, S.C. Unwin, and R.V. Stachnick, eds.
What is an Interferometer? http://huey.jpl.nasa.gov/keck/publicWWW/overview/intro-interferometry.html, pp. 1-3, printed Jul. 22, 2002.

(Continued)

*Primary Examiner*—Patrick Connolly
(74) *Attorney, Agent, or Firm*—McDermott Will & Emery LLP

(57) ABSTRACT

A spectrometer that implements the functionality of a Fizeau interferometer, the spectrometer including a collection device that is configured to collect a wavefront, a deformable mirror disposed at an image plane of the collection device, the deformable mirror having a plurality of sections, at least one of which is deformed to form interference patterns on the wavefront at the image plane, and a Fourier transformation module configured to derive spectral information from the interference patterns.

25 Claims, 13 Drawing Sheets

OTHER PUBLICATIONS

Lampe, Lutz H.J. et al., "Noncoherent Continuous-Phase Modulcation for DS-CDMA", No date.

Gonsalves, Robert A., "Phase Retrieval and Diversity in Adaptive Optics.", Optical Engineering, vol. 21, No. 5, Sep./Oct. 1982.

* cited by examiner

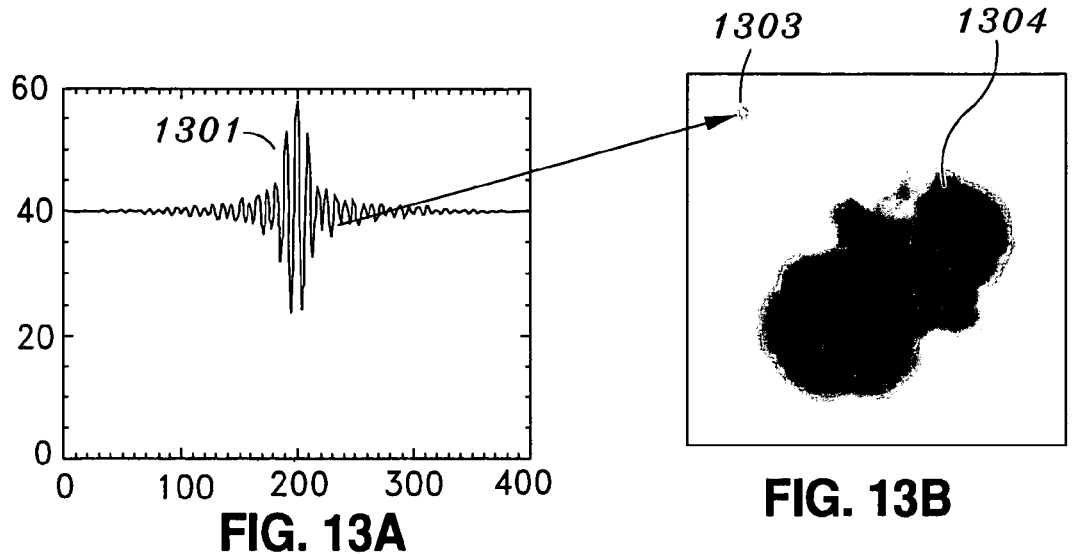
FIG. 13A
FIG. 13B
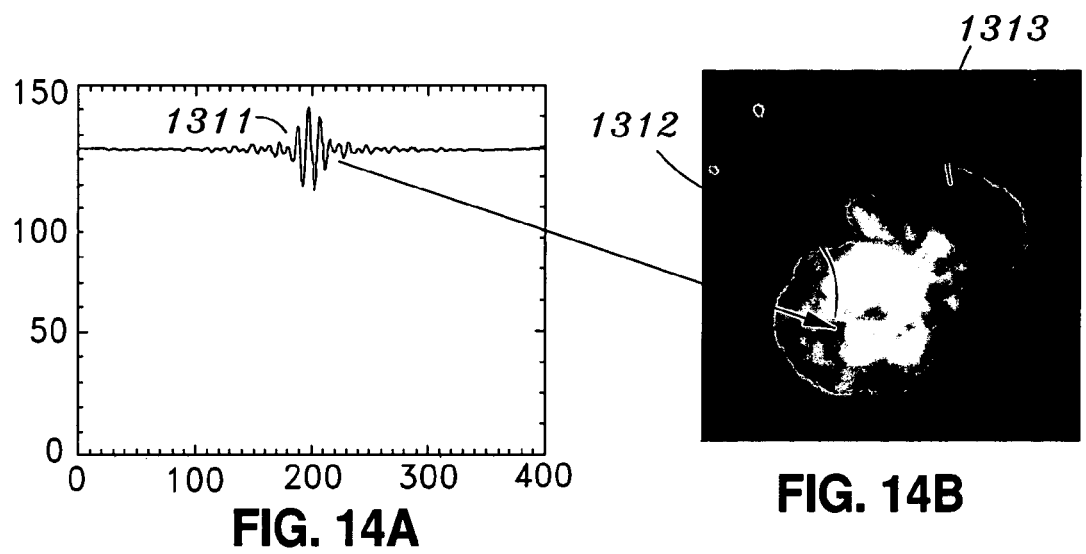
FIG. 14A
FIG. 14B
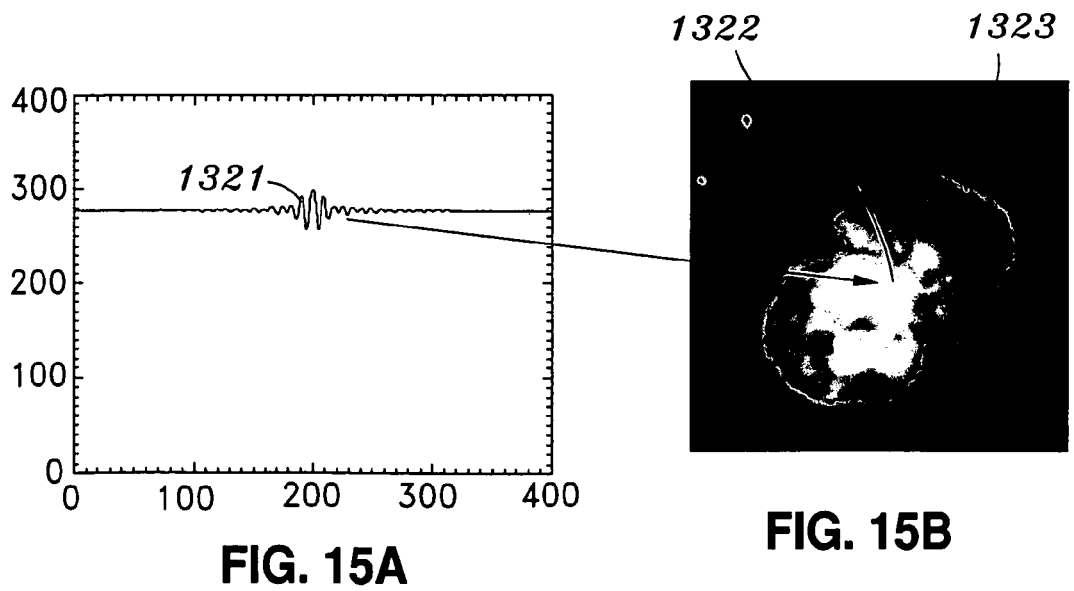
FIG. 15A
FIG. 15B

FOURIER TRANSFORM SPECTROMETRY WITH A SINGLE-APERTURE INTERFEROMETER

CROSS-REFERENCE TO RELATED APPLICATIONS

This application claims priority to U.S. Provisional Patent Application No. 60/398,611, filed Jul. 26, 2002, entitled IMAGING FOURIER TRANSFORM SPECTROMETRY WITH A FIZEAU INTERFEROMETER, and to U.S. Provisional Patent Application No. 60/572,769, filed May 21, 2004, entitled FOURIER TRANSFORM SPECTROSCOPY WITH A DEFORMABLE MIRROR, both of which are incorporated by reference herein for all purposes. In addition, this application is a continuation-in-part of U.S. patent application Ser. No. 10/627,404, filed Jul. 25, 2003 now U.S. Pat. No. 7,034,945, entitled FOURIER TRANSFORM SPECTROMETRY WITH A MULTI-APERTURE INTERFEROMETER, which is incorporated by reference herein for all purposes.

STATEMENT AS TO RIGHTS TO INVENTIONS MADE UNDER FEDERALLY SPONSORED RESEARCH OR DEVELOPMENT

Not applicable to this invention.

BACKGROUND OF THE INVENTION

1. Field of the Invention

The invention is generally directed to optical systems, such as spectrometers, and more specifically to methods and apparatus for extracting spectral information from a wavefront, such that select portions of the wavefront are sampled by a single optical device forming an Fizeau interferometer.

2. Description of the Related Art

To extract spectral information from electromagnetic radiation, such as infrared radiation, light, and ultraviolet radiation, spectrometers are often employed. One commonly used spectrographic technique to extract spectral information from collected light includes spectrally dispersing (i.e., physically spreading out) the light into its constituent wavelengths with a prism or diffraction grating. Once the constituent wavelengths of the light are spectrally dispersed, various wavelength detection techniques may be used to determine whether given wavelengths are present in the light. For example, the spectral dispersion of the light may by calibrated and a simple photocell used to detect a wavelength's presence within the spectral dispersion. Spectral dispersion of light has been used by scientists for centuries to determine the colors in light. For example, Sir Isaac Newton in the seventeenth century used prisms to demonstrate that light is comprised of many colors by using a first prism to spectrally disperse light and a second prism to recombine the light.

More recently developed techniques for extracting spectral information from light include Fourier transform spectroscopy techniques. Typical Fourier transform spectroscopy techniques include splitting a collected wavefront into two wavefronts and interfering the wavefronts to form an interference pattern. An optical path length of one of the two wavefronts is typically varied to collect intensity information from a number of interference patterns formed by the interfering wavefronts. The intensity information is then Fourier transformed to extract spectral information for the wavefront. Fourier transform spectrometers that include Michelson interferometers have been used with some success to extract spectral information from electromagnetic radiation, such as light. However, such Fourier transform spectrometers provide limited spectral resolution of collected wavefronts. Moreover, Michelson interferometers are inherently inefficient due in part to the beam splitters that are used to split wavefronts because the beam splitters reflect and absorb electromagnetic radiation that does not contribute to forming interference patterns. In low light spectroscopy measurements, for example, the loss of light in a Michelson interferometer tends to adversely affect the quality of extracted spectral information.

Accordingly, industry continues to strive to develop new Fourier transform spectrometers and techniques to extract spectral information from collected electromagnetic radiation. Specifically, Fourier transform spectrometers are desired that employ Fizeau interferometers.

SUMMARY OF THE INVENTION

This invention provides to optical systems, such as spectrometers, and more specifically provides methods and apparatus for extracting spectral information from a wavefront, such that select portions of the wavefront are sampled by a single optical device forming an Fizeau interferometer.

Specifically, according to one aspect of the invention, a spectrometer is provided that implements the functionality of a Fizeau interferometer. The spectrometer includes a collection device that is configured to collect a wavefront, a deformable mirror disposed at an image plane of the collection device, the deformable mirror having a plurality of sections, at least one of which is deformed to form interference patterns on the wavefront at the image plane, and a Fourier transformation module configured to derive spectral information from the interference patterns.

According to another aspect, the invention concerns a method for deriving a spectral information from a wavefront. The method includes the steps of collecting a wavefront with a collection device, interfering the collected wavefront with a deformable mirror disposed at an image plane of the collection device to form interference patterns at the image plane, the deformable mirror having a plurality of sections, at least one of which is deformed, and Fourier transforming the interference patterns to derive spectral information for the wavefront.

The deformed sections of the mirror introduce a changed path length to a corresponding section of the wavefront so as to form in interference pattern on the wavefront. The Fourier transform module derives the spectral information by Fourier transforming the interference patterns of the wavefront while the mirror sections are consecutively deformed in accordance with a series of predetermined deformation patterns. In this regard, the Fourier transformation module includes an image-capture array which is disposed at the image plane and which is configured to capture images of the interference pattern. Each of the images are processed to perform the Fourier transformation of the interference patterns of the wavefront.

Numerous benefits may be achieved using the present invention over conventional techniques. For example, the invention provides for increased spectral resolution of scenes as well as localized sources. In other embodiments, a relatively large percentage of collected light contributes to the formation of interference fringes and thereby improves spectral resolution of low light signals. These and other benefits are described throughout the present specification and more particularly below.

The invention will be better understood upon reference to the following detailed description in connection with the accompanying drawings and appended claims.

BRIEF DESCRIPTION OF THE DRAWINGS

FIG. 13A is a fringe packet plot of the pixel identified as a point source located outside of the astronomical object shown in FIG. 13B, according to an embodiment of the spectrometer shown in FIG. 8.

FIG. 14A is a fringe packet plot of the pixel located at an edge of the debris cloud of the astronomical object shown in FIG. 14B, according to an embodiment of the spectrometer shown in FIG. 8.

FIG. 15A is a fringe packet plot of the pixel located at the bright center of the astronomical object shown in FIG. 15B, according to an embodiment of the spectrometer shown in FIG. 8.

DETAILED DESCRIPTION

This invention relates generally to optical systems, such as spectrometers, and more specifically to a method and apparatus for extracting spectral information from a wavefront, such that select portions of the wavefront are sampled by a plurality of optical devices forming an Fizeau interferometer.

Embodiments of the invention are best understood by first describing an exemplary Fourier transform spectrometer and methods for deriving spectral information from a wavefront and second briefly describing the theory of Fourier transform spectroscopy.

Figure 1:
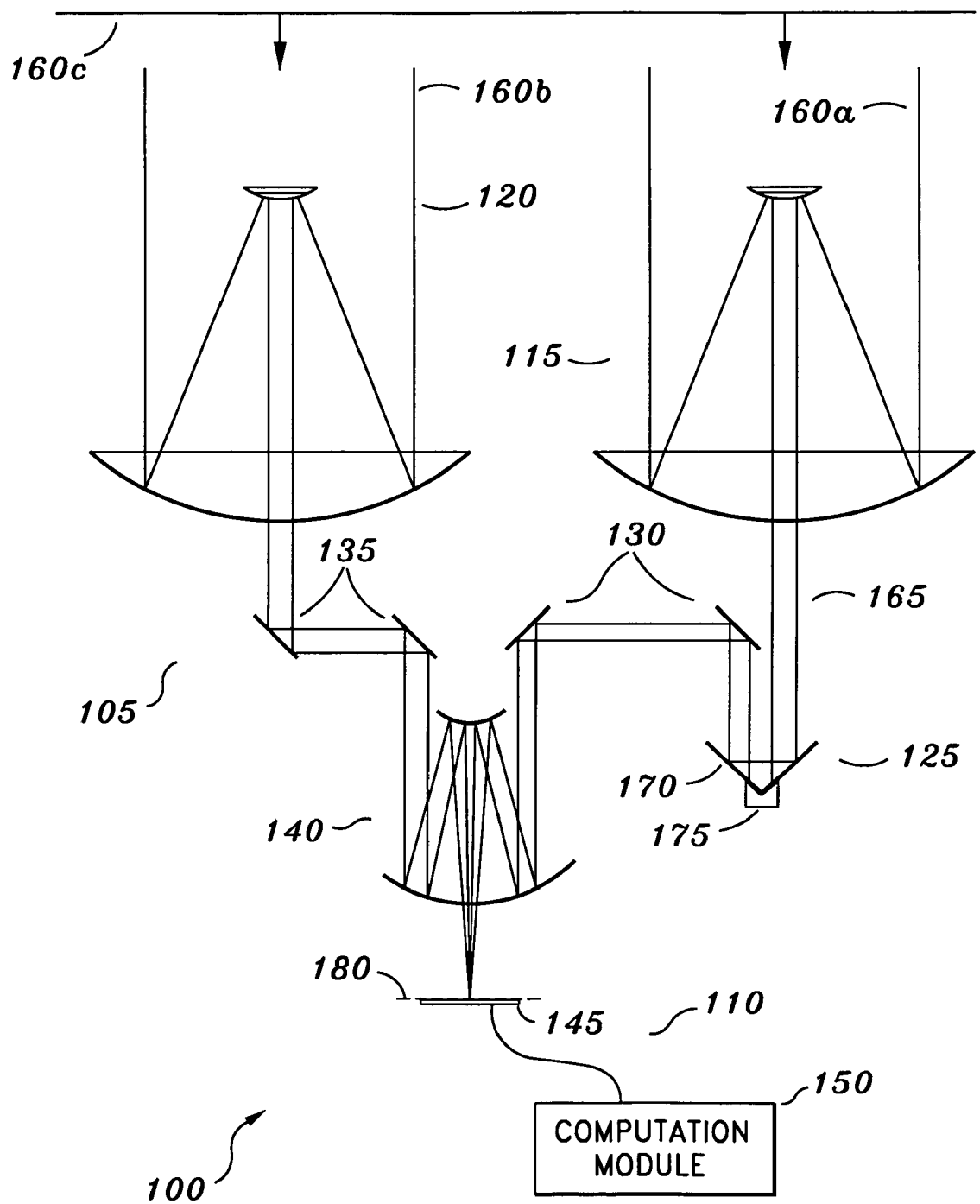
FIG. 1 shows a simplified diagram of a spectrometer according to an embodiment of the present invention.
Figure 2A:
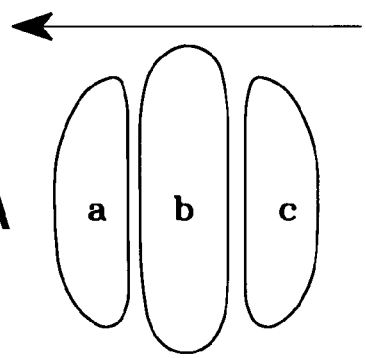
FIGS. 2A-2G show simplified interference patterns of interfering wavefronts of electromagnetic radiation that may be formed at an image plane and collected by an image-capture array according to an embodiment of the present invention.
Figure 2B:
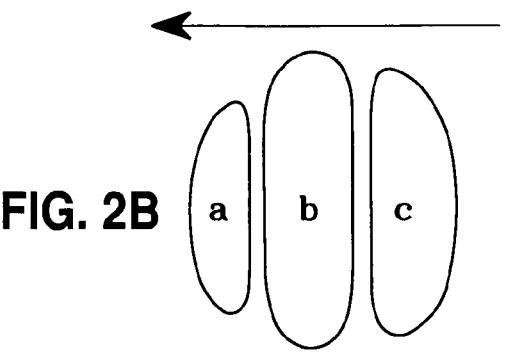
Figure 2C:
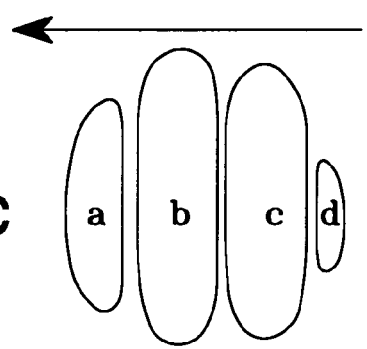
Figure 2D:
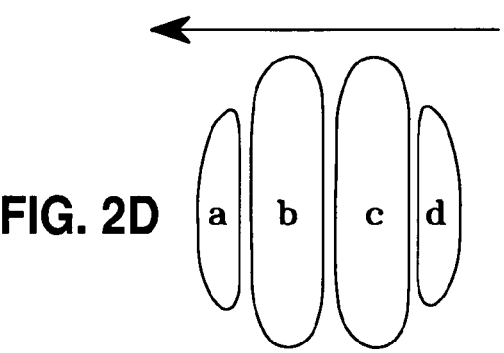
Figure 2E:
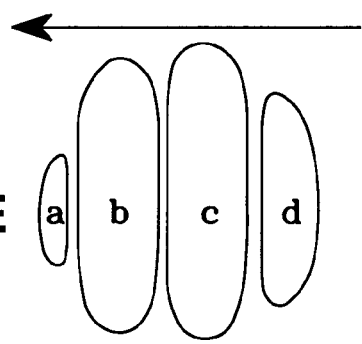
Figure 2F:
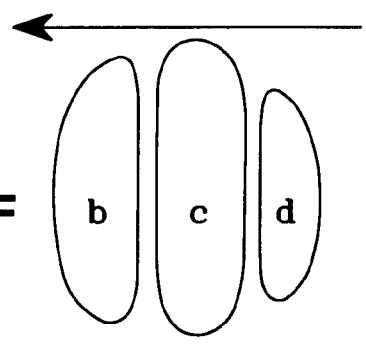
Figure 2G:
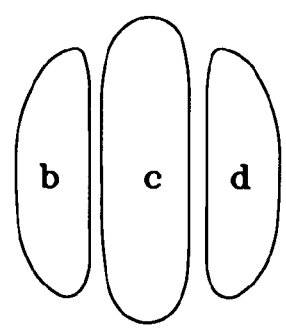

FIG. 1 shows a simplified diagram of a Fourier transform spectrometer 100 according to an embodiment of the present invention. Fourier transform spectrometer 100 includes a Fizeau interferometer 105 and a Fourier transformation module 110. Fizeau interferometer 105 is configured to collect select portions of a wavefront and interfere the collected portions of the wavefront on an image plane (i.e., focal plane) of the Fizeau interferometer to form interference patterns, such as a fringe patterns. Fizeau interferometers can be generally characterized as being configured to form interference patterns of collected wavefronts on the interferometers' image planes. Fourier transformation module 110 is configured to Fourier transform the interference patterns and thereby derive spectral information for the wavefront. Fizeau interferometer 105 and Fourier transformation module 110 are presently described in further detail.

According to one embodiment, Fizeau interferometer 105 includes first and second collection devices 115 and 120, respectively, an optical-path-delay mechanism 125, first and second steering mechanisms 130 and 135, respectively, and combiner optics 140. Fourier transformation module 110 may include an image-capture array 145 and a computation module 150. First and second collection devices 115 and 120 may include, respective, first and second afocal telescopes arranged in an extended aperture telescope configuration. While FIG. 1 shows that first and second collection devices 115 and 120 to be two element devices, these collection devices may have nearly any useful configuration, including, but not limited to, three mirror anastigmats, four mirror telescopes and the like. The first and second collection devices are configured to collect select wavefront portions 160a and 160b of a wavefront 160c. According to one embodiment, wavefronts portions collected by the first and second optical devices are essentially plane wavefronts. That is, the electromagnetic radiation, such as light, forming the wavefronts is substantially parallel. Substantially parallel electromagnetic radiation might emanate from a source that is essentially an infinite distance from Fourier transform spectrometer 100. An essentially infinite distance may be the distance to a cosmic body, such as a planet, star, galaxy or the like, or to an object positioned on the Earth on in the Earth's atmosphere.

According to one embodiment, optical-path-delay mechanism 125 is configured to vary the path length of an adjustable-optical path 165. Although collection devices 115 and 120 may be rigidly fixed with respect to one another, varying the path length of adjustable-optical path 165 may be viewed as pistoning the collection devices. Adjustable optical path 165 may be extended or shortened by translating optical-path-delay mechanism 125 along adjustable-optical path 165. The optical-path-delay mechanism may include a set of delay optics 170 and a translation device 175 configured to translate the delay optics. Delay optics 170 may include a roof prism, a pair of reflective flats or other devices that are configured to reflect electromagnetic radiation received from collection device 115 to steering mechanism 130. Translation device 175 may include a piezoelectric device, a stack of piezoelectric devices, a solenoid, a combination of the foregoing or the like. Translation device 175 may be configured to translate delay optics 170 a number centimeters, a number microns, or a number of nanometers in sub-angstrom, angstrom, nanometer or larger steps. While Fizeau interferometer 105 is shown to include a single optical-path-delay mechanism 125 configured to vary adjustable-optical path 165 associated with collection device 115, according to one embodiment, the Fizeau interferometer may include a second optical-path-delay mechanism configured to vary an adjustable-optical path associated with collection device 120.

Wavefront portions 160a and 160b that are collected by collection devices 115 and 120 are steered by steering mechanisms 130 and 135 into combiner optics 140. Steering mechanism 130 and 135 may include a number of reflectors, such as reflective flats, that may by controlled by piezoelectric devices or the like to steer the wavefront portions. The combiner optics may include a combiner telescope that is configured to combine and interfere wavefront portions 160a and 160b at an image plane 180 (shown as a dashed line) and form interference patterns thereat. According to one embodiment, image-capture array 145 is disposed at the image plane and is configured to capture images of the interference pattern. Image-capture array 145 may include a charge coupled device (CCD) array, a complimentary metal oxide (CMOS) array or the like. The image-capture array is configured to generate electronic signals from the formed interference patterns. The electronic signals may be transferred to the computation module, which is configured to Fourier transform the received electronic signals. Fourier transformation of interference patterns is described in further detail below.

FIGS. 2A-2G show simplified interference patterns 200a-200g, respectively, of interfering wavefronts of electromagnetic radiation that may be formed at image plane 180 and collected by image-capture array 145. The exemplary interference patterns may be from a point source, such as a star. The interference patterns may be generated with adjustable-optical path 165 set at a number different lengths (e.g., 30 nanometers steps). As the adjustable-optical path is increased (or decreased), the fringes, labeled a-d, may sweep across image plane 160 from right to left (or left to right) as indicated by the leftward pointing arrows above each interference pattern.

Figure 3:
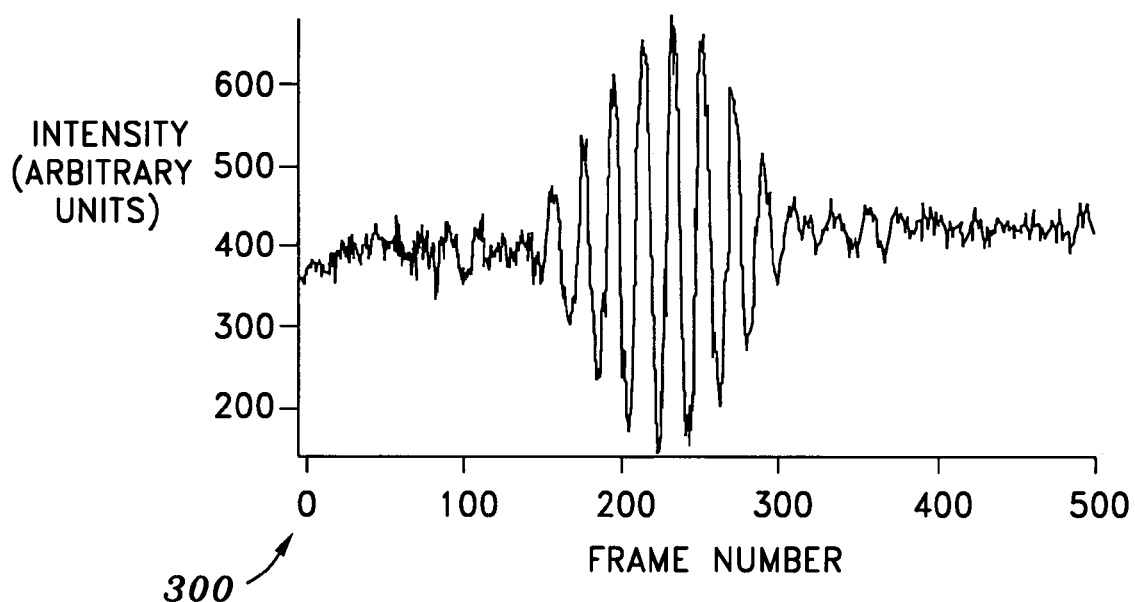
FIG. 3 shows an example of an intensity profile (sometimes referred to as an "interferogram" or a "fringe packet") that may be collected by a single pixel as an adjustable-optical path is varied.

As the adjustable-optical path is varied, pixels in image-capture array 145 may capture the varying intensities of the fringes as the fringes sweep past the pixels. FIG. 3 shows an example of intensity profile 300 (sometimes referred to as an interferogram or a fringe packet) that may collected by a single pixel as the adjustable-optical path is varied. The vertical axis of the intensity profile represents arbitrary intensity units and the horizontal axis represents frame numbers corresponding to images of the interference patterns captured by a pixel. The intensity profile shown in FIG. 3 may be generated, for example, by varying the adjustable-optical path through a span of about 15 micrometers in about 30 nanometer steps.

As mentioned briefly above, computation module 150 is configured to Fourier transform an intensity profile, such as the intensity profile shown in FIG. 3 and thereby derive spectral information for a wavefront from which the intensity profile is derived. Computation module 150 may be configured to transform the intensity profiles generated by each pixel in image-capture array 145 or a subset thereof. Fourier transformation of the intensity profile shown in FIG. 3 may provide, for example, the spectral information shown in spectrogram 400 of FIG. 4. Spectrogram 400 shows spectral information for an approximately white light source. Computation module 150 may be implemented in a software, hardware, firmware or a combination of the foregoing. For example, the computation module may be implemented in software code configured to run on a personal computer, dedicated electronic devices or the like. Alternatively, the computation module may be implemented in a computer chip, such as an application specific (ASIC) device, configured to operate as a stand-alone electronics device or configured to be used in a personal computer configured to control the computer chip. These example implementations of Fourier transformation module 110 and computation module 150 are not exhaustive; those of skill in the art will know of a number of ways to implement a these modules, which are configured to Fourier transform interference patterns and more specifically transform intensity profiles.

Figure 5:
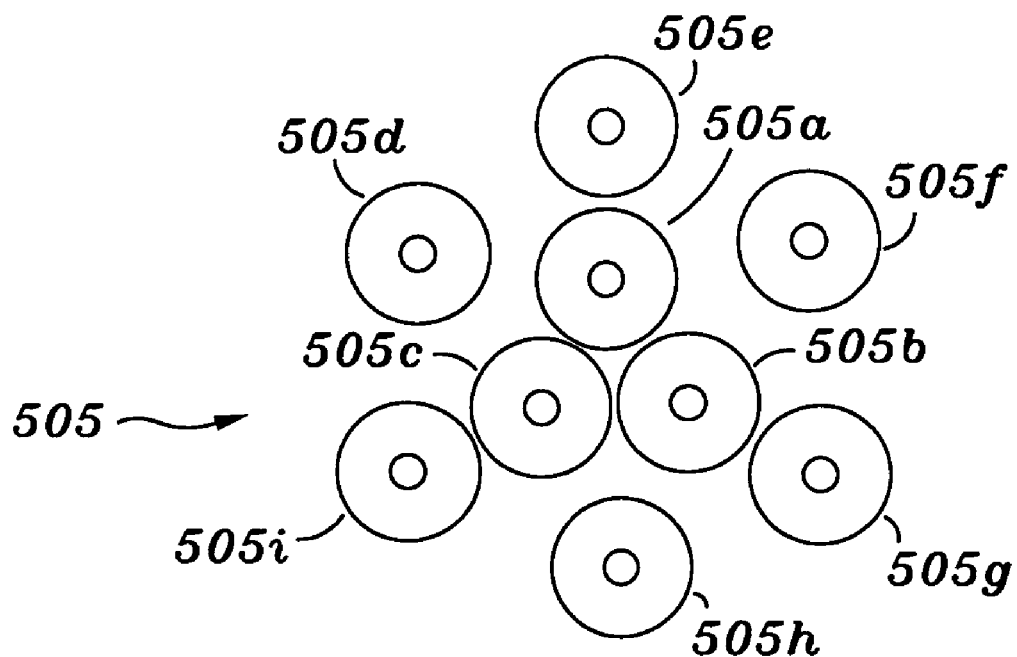
FIG. 5 shows a top view of Fizeau interferometer that includes nine collection devices according to an embodiment of the present invention.
Figure 6:
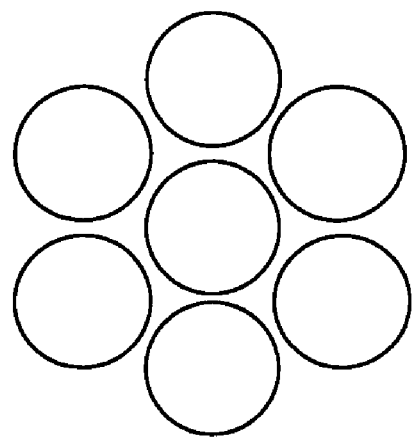
FIG. 6 shows an example of an interference pattern that may be generated by three collection devices.

While Fizeau interferometer 105 has been characterized above as including two collection devices, embodiments of the present invention may include Fizeau interferometers that include more than two collection devices. For example, U.S. Pat. No. 5,905,591 of Duncan et al., filed Feb. 18, 1997, titled Multi-Aperture Imaging System, whish is incorporated herein by reference for all purposes and is owned by Lockheed Martin Corporation, owner of the present invention, describes a multi-aperture telescope forming a Fizeau interferometer that includes a number of sub-apertures telescopes and may be included in a Fourier transform spectrometer according to an embodiment of the present invention. FIG. 5 shows a top view of another Fizeau interferometer 500 that includes nine collection devices labeled 505a-505i that may be included in another embodiment of the present invention. Each of collection devices 505a-505i may be configured similarly to the collection devices described above, for example, each of the collection devices may include an optical-path-delay mechanism, such as that shown in FIG. 1 and described above. One or more of the optical-path-delay mechanisms of collection devices 505a-505i may be adjusted to vary their corresponding adjustable-optical paths to generate interference patterns that are Fourier transformed. It should be understood that while the foregoing described exemplary embodiments include two, nine, and twelve collection devices, embodiments of the present invention are not limited to these numbers of collection devices. Nearly any number of collection devices may be included in Fizeau interferometers that may be included in Fourier transform spectrometers according to embodiments of the present invention. Therefore, the forgoing examples are not limiting on the invention as claimed, but should be understood to be exemplary embodiments. While the above-described embodiments of Fourier transform spectrometers include Fizeau interferometers that include a number of collection devices, not all collection devices need be used in combination to form interference patterns. Fewer than the total number of collection device included in a Fizeau interferometer may be used to generate interference patterns. For example, collection devices 505a-505c may be used to generate the interference pattern shown in FIG. 6.

Figure 7:
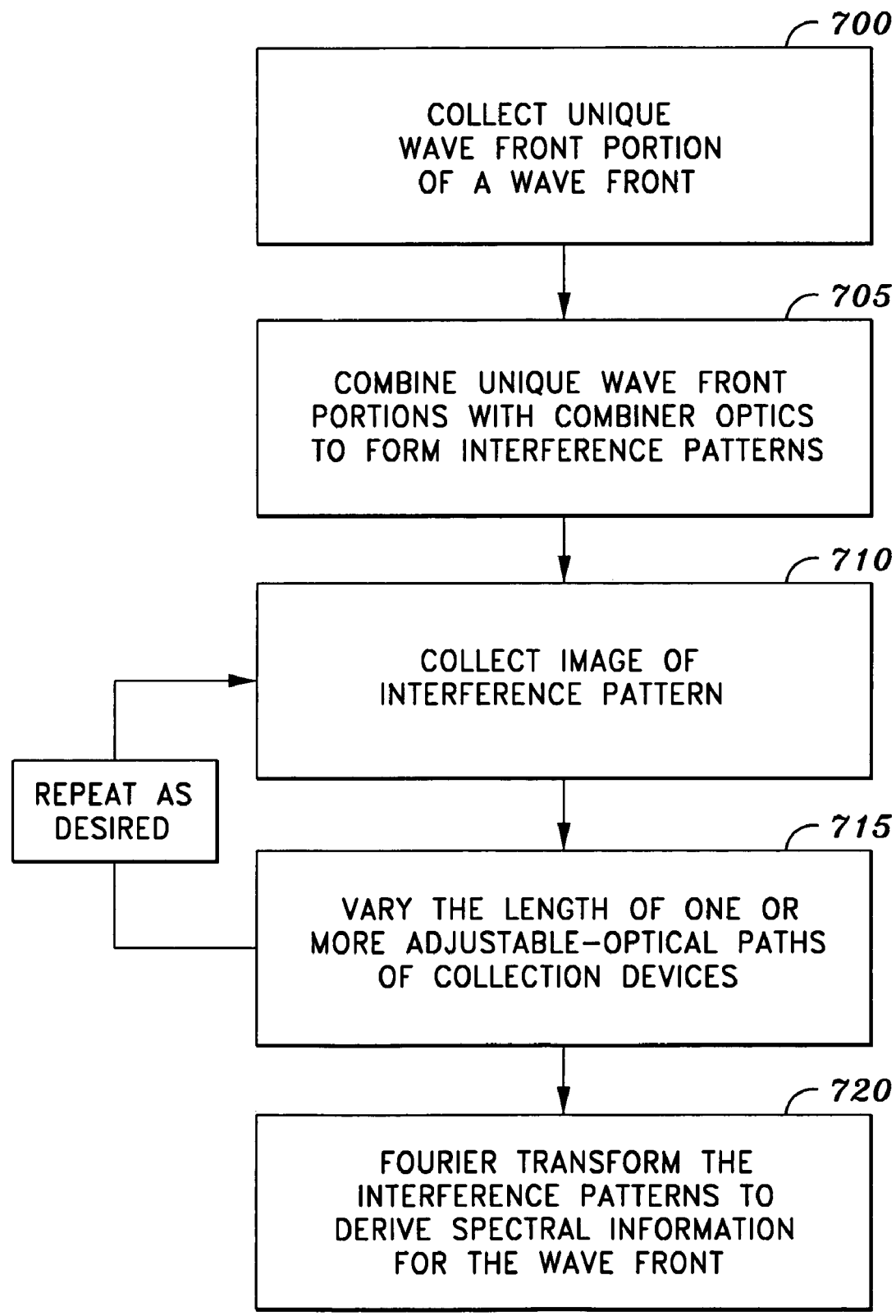
FIG. 7 is a high-level flow chart showing steps for deriving spectral information from a wavefront according to an embodiment of the present invention.

FIG. 7 is a high-level flow chart showing steps for deriving spectral information from a wavefront according to an embodiment of the present invention. It should be realized that the steps shown in FIG. 7 are not limiting on the invention as recited in the claims. Other techniques having fewer, substitute, and/or additional steps are within the purview of the invention and will be readily apparent to those of skill in the art. At 700, a plurality of select wavefront portions of a wavefront is collected by a corresponding plurality of collection devices. At 705, the wavefront portions are combined by a set of combiner optics and projected onto an image plane (e.g., a real image plane). According to one embodiment, the wavefront portions are steered into the combiner optics by sets of steering mechanisms. At 710, an interference pattern formed at the image plane is captured by an image-capture array. At 715, one or more adjustable-optical paths of the collection devices are varied and step 710 is repeated for each adjustment of the one or more adjustable-optical paths. Varying one or more adjustable-optical paths and capturing images of the interference patterns for the various path lengths may be repeated as desired. For example, the adjustable-optical paths may be varied by relatively large distances if relatively high-resolution spectral information is desired. At 720, image information for the interference patterns is Fourier transformed to derive the spectral information for the wavefront. Image information collected by one or more pixels in an image-capture array may be Fourier transformed to extract spectral information.

The following discussion provides a brief overview of the theory of Fourier transform spectroscopy. In the case that a wavefront includes a single wave number, $k=2\pi\lambda$, the total intensity of light at a point on an image plane may be $$I(\Delta)=2Io+\cos(k\Delta)),$$

wherein $\Delta$ is a piston offset (i.e., optical path length difference) between two collection devices, which illuminate a point at which $I(\Delta)$ is measured with I o. In the case that a wavefront includes a spectrum of light, the intensity of illumination at the point may be described with the integral expression:

$$I(\Delta)=2\int Io(k)(1+\cos(k\Delta))dk=\int E(k)dk+\int E(k)\cos(k\Delta))dk.$$

In the above expression, the first integral, $\int E(k)dk$ is the total energy on the focal plane at the point of interest, and the second integral, $\int E(k)\cos(k\Delta))dk$, is the Fourier transform of $I(\Delta)$. Fourier transformation theory provides that the integrals may be rewritten as:

$$E(k)=\int I(\Delta)\cos(-k\Delta))d\Delta$$

in the limit where $d\Delta$ is continuous and extends to infinity. $E(k)$ represents the spectral information included in a wavefront and may be calculated by Fourier transforming the intensity distribution $I(\Delta)$ (e.g., interferogram, such as the intensity distribution shown in FIG. 4). A finite range of $d\Delta$ has two effects on an estimate of $E(k)$. A first effect is that the resolution is proportional to $1/L$, wherein L is a total path difference between two collection devices. That is, relatively high spectral resolution may be achieved by pistoning the collection devices by relatively large amounts and relatively low spectral resolution may be achieved by pistoning the collection devices by relatively small amounts. A second effect is that the finite data sample convolves $E(k)$ with the transfer of a windowing function. To minimize ringing due to the Gibbs phenomena, a Hanning window is used. A further understanding of Fourier transformation spectroscopy theory may be found in Transformations in Optics, of L. Mertz, Wiley, New York, 1965, which is incorporated by reference herein.

Figure 8:
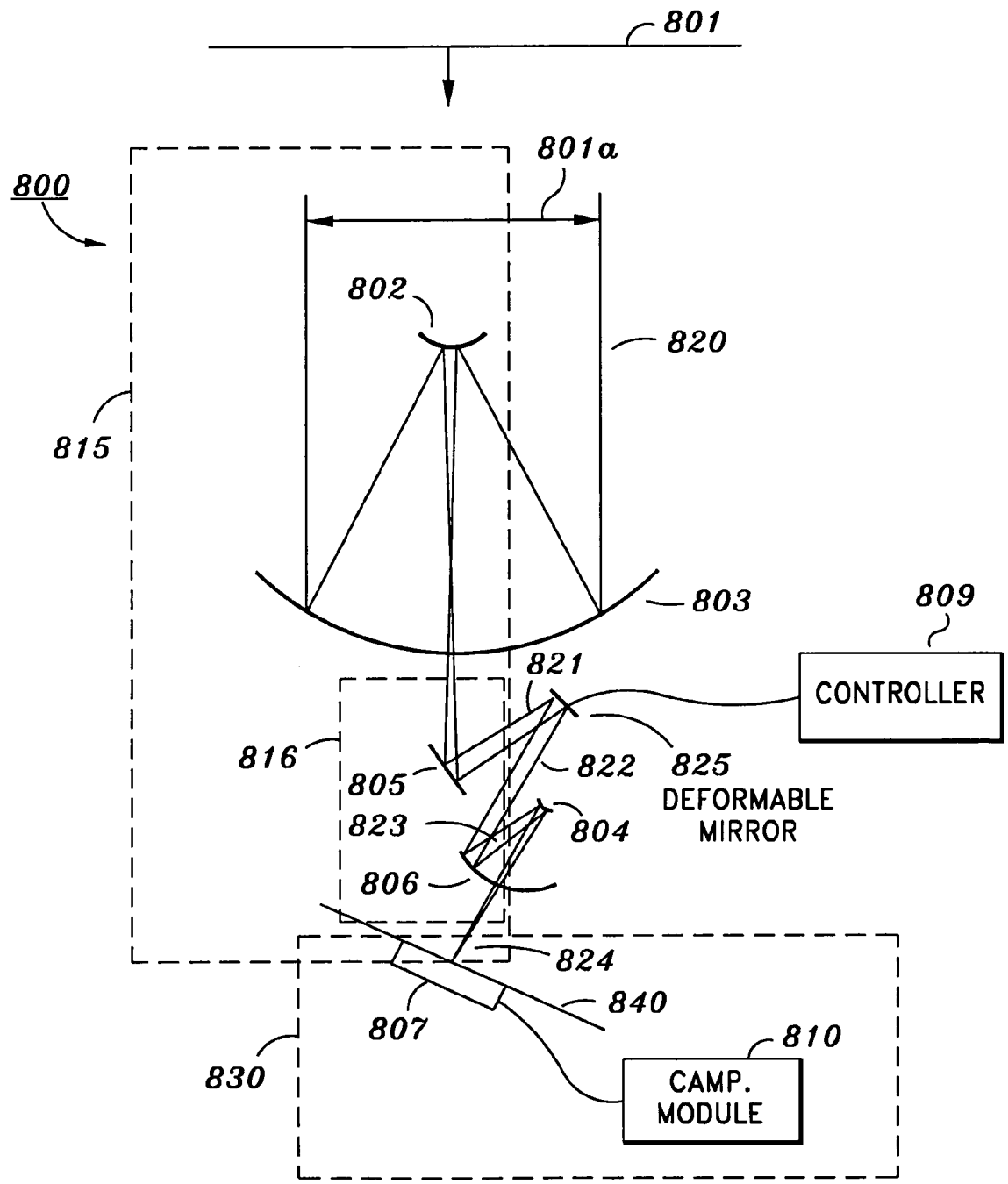
FIG. 8 shows a simplified diagram of a single-aperture spectrometer according to another embodiment of the present invention.

FIG. 8 depicts a single-aperture spectrometer according to another embodiment of the invention. The mathematical description of a single telescope Fizeau Fourier Transform Imaging Spectroscope (FTIS) is, in general, identical to that of a standard imaging system with path length variations added into specific portions of the telescope pupil function through the use of a deformable mirror. The fundamental operating procedure for a Fizeau FTIS is the same as for the traditional Michelson configuration. A series of images is acquired while the path length is varied. In this regard, the spectral resolution for the FTIS is a function of the total path length variation during the acquisition of images. The resolution is given by 1/L where L is the total optical path length (OPL) variation. For visible wavelengths, an R (lambda divided by delta lambda) of about 40 is achieved with a path length of 15 microns. Fifteen microns of OPL variation is about the limit of currently available continuous deformable mirrors (DM's). Segmented DM's on the other hand can easily accommodate a 60 micron OPL, which would result in an R of about 1600 in the visible wavelength region for increased resolution.

As seen in FIG. 8, spectrometer 800 is comprised of a single-aperture interferometer in which the interference is created on the wavefront by a deformable mirror. Specifically, Fizeau interferometer 815 includes a collection device 820, a steering mechanism 816, and deformable mirror 825. Fourier transformation module 830 may include an image-capture array 807 and a computation module 810. Collection device 820 may be comprised of an afocal telescope arranged in an extended aperture telescope configuration by lenses 802 and 803. Collection device 820 is configured to collect a wavefront portion 801*a* of wavefront 801. According to one embodiment, wavefront portion 801*a* collected by collection device 820 is essentially a plane wavefront. That is, the electromagnetic radiation, such as light, forming the wavefront is substantially parallel, such as electromagnetic radiation might that emanates from a source that is essentially an infinite distance from Fourier transform spectrometer 800. An essentially infinite distance may be the distance to a cosmic body, such as a planet, star, galaxy or the like, or to an object positioned on the Earth or in the Earth's atmosphere.

Returning to FIG. 8, wavefront portion 801*a* that is collected by collection device 820 is steered by steering mechanism 816 into deformable mirror 825. Steering mechanism 816 may include a number of reflectors, such as reflective flats 804 and 805 and reflector lens 806, that may by controlled by piezoelectric devices or the like to actively steer wavefront portion 801*a*. In this regard, steering mechanism 816 creates intermediate paths 821, 822 and 823 which direct collected wavefront 801*a* to deformable mirror 825, off of which emanates optical path 824 to image plane 840. Known types of deformable mirror (DM) 825 may be used to implement the present invention. For example, deformable mirror 825 may be a standard continuous face sheet DM, a segmented DM or possibly a liquid crystal variable-phase retarding element. In the embodiment of FIG. 8, deformable mirror 825 is comprised of a plurality of sections, each of which may be deformed to form interference patterns at image plane 840. The functionality of deformable mirror 825 is described in more detail below. Controller 809 is used to provide input signals to each deformable section of deformable mirror 825, preferably according to a series predetermined deformation patterns which may be stored in controller 809, or provided to controller 809 from an external source, such as a computer.

According to one embodiment, image-capture array 807 is disposed at image plane 840 and is configured to capture images of the interference pattern at image plane 840. Image-capture array 807 may include a charge coupled device (CCD) array, a complimentary metal oxide (CMOS) array or the like. Image-capture array 807 is configured to generate electronic signals from the formed interference patterns. The electronic signals may be transferred to computation module 810, which is configured to Fourier transform the received electronic signals. In this regard, the functionality of image-capture array 807 and computation module 810 is similar to that described above with respect to the embodiment shown in FIG. 1. In one possible embodiment, computation module 810 and controller 809 may be combined onto a single computational device, such as a computer or processor. Fourier transformation of interference patterns formed by Fizeau interferometer 815 is described in further detail below.

Figure 9A:
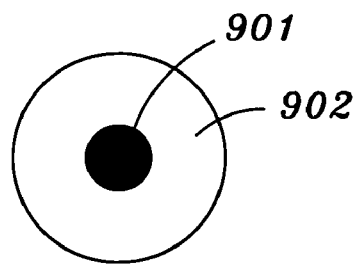
FIGS. 9A to 9D show various pupil arrangements that may be formed by the deformable mirror according to an embodiment of the spectrometer shown in FIG. 8.
Figure 9B:
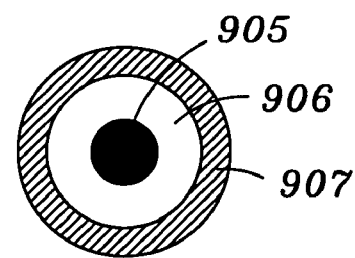
Figure 9C:
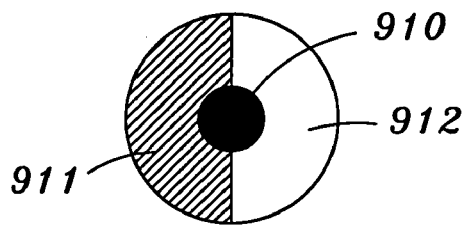
Figure 9D:
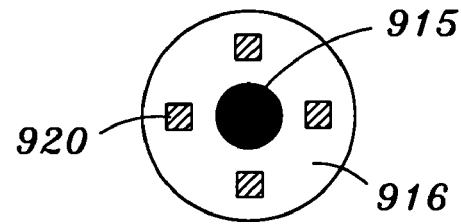

FIGS. 9A to 9D depict various pupil arrangements that may be formed by deformable mirror 825. The spatial resolution of spectrometer 800 is a function of the aperture geometry. As described above, spectrometer 800 is comprised of a single aperture telescope whose pupil is divided into sections with varying path length through the use of deformable mirror 825. FIG. 9a shows a pupil arrangement formed by deformable mirror 825 which forms circular aperture sections 901 and 902 at the pupil. Dark circular region 901 in the center is the obscuration from the secondary mirror. FIGS. 9B, 9C, and 9D are diagrams indicating differing arrangements of intra pupil regions of path length variation formed by deformable mirror 825. The shaded areas, 907 in FIG. 9B, 911 in FIG. 9C, and 912 in FIG. 9D, indicate regions of path length variation. The pupil can be divided in half as shown in FIG. 9C, in concentric annular regions as shown in FIG. 9B, or in varying regions 920 that may be advantageous for imaging particular objects as shown in FIG. 9D.

Figure 10A:
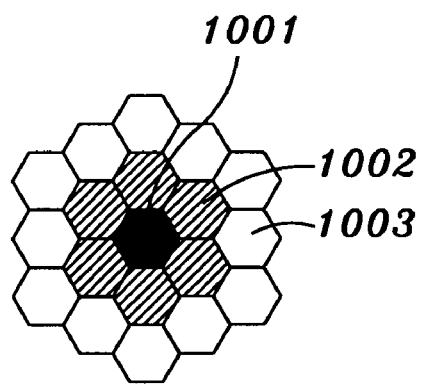
FIGS. 10A to 10C show various alternative pupil arrangements formed by the deformable mirror according to an embodiment of the spectrometer shown in FIG. 8.
Figure 10B:
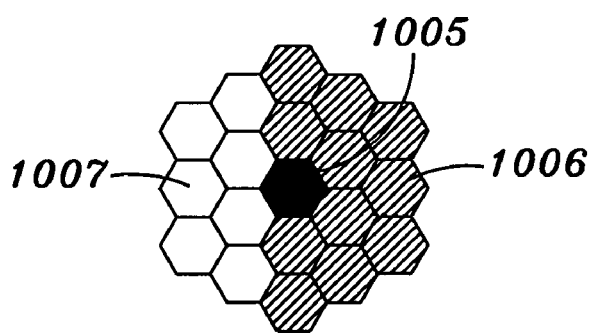
Figure 10C:
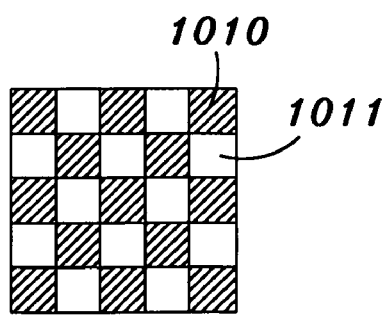

Similar to FIGS. 9A to 9D, deformable mirror 825 can also be segmented as shown in FIGS. 10A to 10C depict different arrangements of mirror segments of deformable mirror 825 that can be moved together in order to introduce desired path length variations into the pupil. In this regard, FIGS. 10A and 10B are standard hexagonal arrangements (deformation patterns) of deformable mirror 825 showing center sections 1001 and 1005, respectively. In FIG. 10A, outer sections 1003 have a different path length with respect to inner sections 1002. In FIG. 10B, left sections 1007 have a different path length with respect to right sections 1006. FIG. 10C is a configuration that would be applicable to current designs for micro-electromechanical (MEMs) devices. In FIG. 10C, dark sections 1010 have a different path length with respect to light sections 1011. As mentioned above, the deformation patterns corresponding to FIGS. 9A to 9D and 10A to 10C are stored in controller 809 according to one embodiment of the invention, whereby controller 809 sends input signals to deformable mirror 825 to control deformation of individual sections of deformable mirror 825 according to a particular pattern.

Figure 11A:
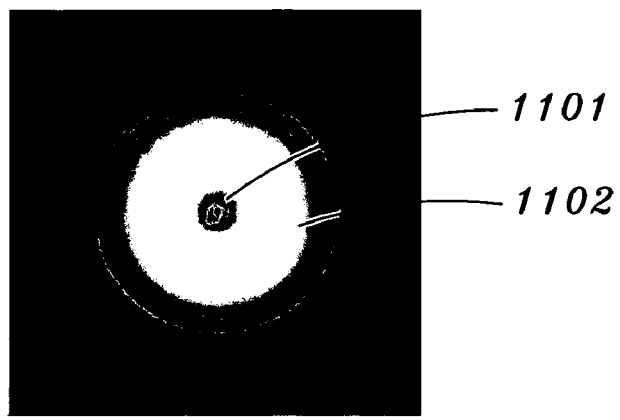
FIGS. 11A-11C are graphic diagrams that depict spatial frequency coverage of the wavefront with interference patterns that may be formed at an image plane and collected by an image-capture array according to an embodiment of the spectrometer shown in FIG. 8.
Figure 11B:
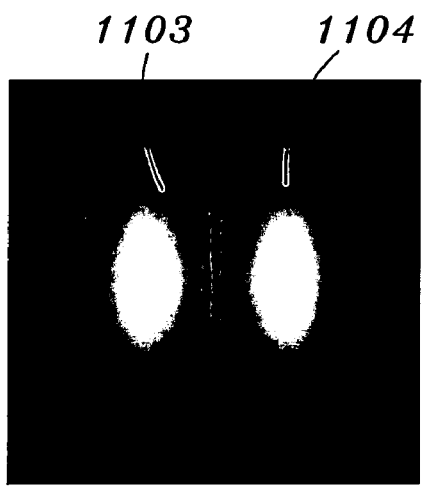
Figure 11C:
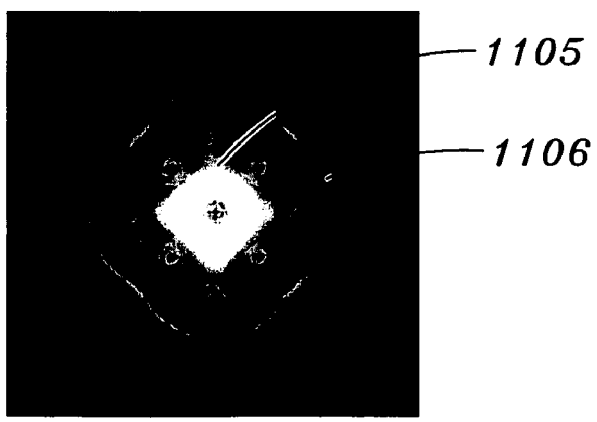

Due to the intra-pupil nature of the Fizeau FTIS, the spectral information is collected only for certain regions in the spatial frequency domain. For multi-aperture telescope systems the amount of coverage in the u,v plane is a strong function of the aperture arrangement. In the single telescope version of FIG. 8, there is a dependence of the areas that are chosen for path length variation but, in general, the coverage is fairly uniform with small areas of zero coverage at the DC position in the u,v plane. The u,v plane coverage for the FTIS is a direct function of the system aperture function and the regions that have path length variation. As an example, FIG. 11A shows the spatial frequencies that will have non-zero terms 1102 (and zero terms 1101) in the spectral information for the aperture shown in FIG. 9B. Similarly, FIG. 11B shows the non-zero frequency coverage regions 1103 and 1104 for the aperture in FIG. 9C, and FIG. 11C shows the non-zero frequency coverage regions 1105 and 1106 for the aperture corresponding to FIG. 9D. In this regard, FIG. 11C illustrates that the regions of path length variation can be adjusted to match the specific spatial frequencies of interest.

Figure 12:
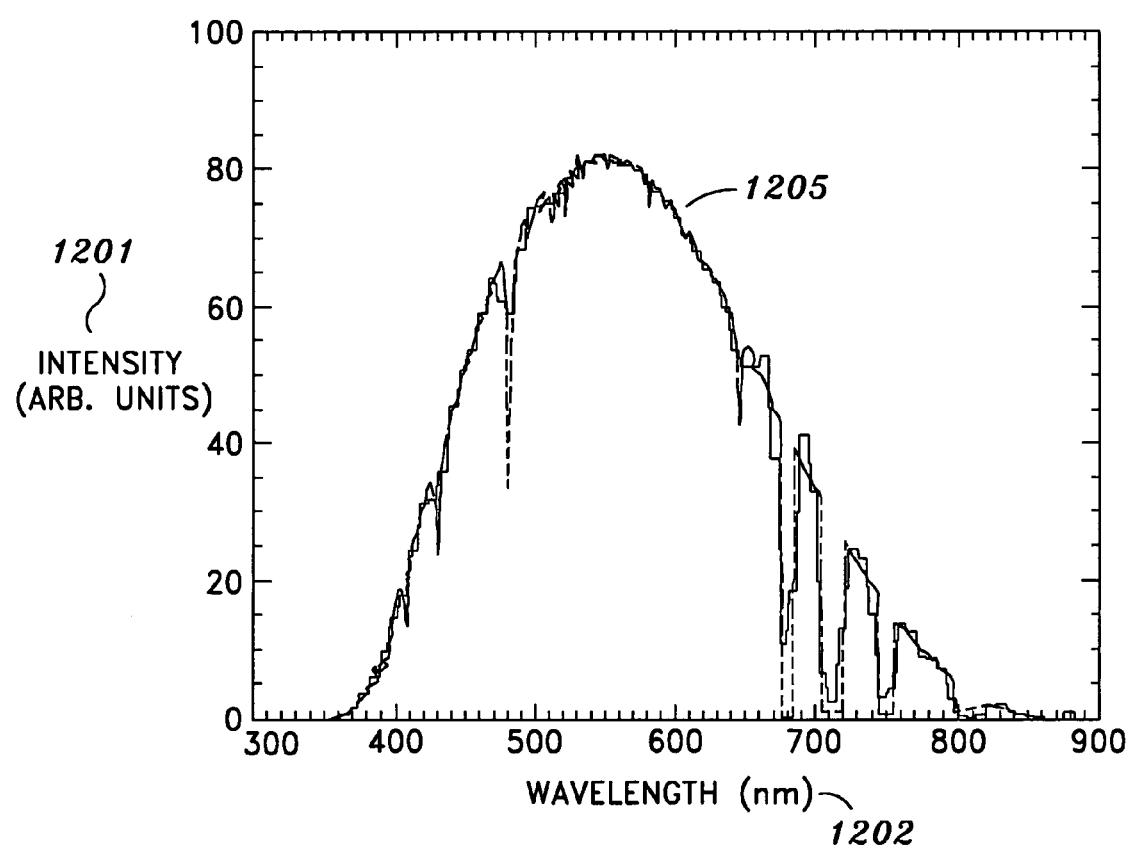
FIG. 12 shows a spectrogram of a simulation according to an embodiment of the spectrometer shown in FIG. 8.

Spectrometer 800 shown in FIG. 8 can typically be used in space for capturing and measuring astronomical-like objects such as point sources and point sources with dust clouds, and can also be used for more complicated objects such as terrestrial scenes. One of the simplest demonstrations of using spectrometer 800 is for point-like objects. In this example, a star is imaged with a single, circular aperture. Path length variations are added into one half of the aperture pupil using deformable mirror 825 at the pupil of image plane 840, as shown in FIG. 9C. In such an example, deformable mirror 825 is split so that there are no contributions from the region between the actuators. The step size is 44 nm of delta path length for each collected image, and the total optical path length variation is 70 microns. The star in this example has the spectral characteristics of a sub-giant A7-IV star and has a focal plane spectral response which is Gaussian from 350 nm to 890 nm. FIG. 12 shows a spectrogram 1205 (intensity 1201 in relation to wavelength 1202) resulting from a simulation of this example, using spectrometer 800. In FIG. 12, The dotted line represents the input spectra (wavefront 801) and the solid line (_____) represents the spectral output from spectrometer 800. Given the path length variation of 70 microns, the average spectral bin width is about 6.6 nm. The spectral bin width varies with wavelength (constant with wave number). For this example, the bin width is 2 nm at 350 nm and about 11 nm at 890 nm.

The intra-pupil FTIS spectrometer 800 has the unique feature of being somewhat sensitive to the object being observed. However, the device is necessarily insensitive to scenes with uniform intensity. In general, this is not a problem for astronomical objects of interest. Another unique feature of spectrometer 800 is that it is insensitive to any near field signal in longer wavelength applications. The near field from each sub-aperture of the pupil will not constructively interfere with that of a different aperture because the two are not coherent. This means that the object that is being viewed will modulate as the path lengths are changed but the near field will remain fixed. This feature enhances the signal-to-noise ratio (SNR) of the final spectra measured by spectrometer 800.

In an example of using spectrometer 800 to collect and measure a complicated object, such as a terrestrial scene, a monochromatic image of Eta Carinae is used as the object. The spectrum is assumed to be uniform across each wavelength and the object is assumed to be constant throughout the spectrum from 425 nm to 850 nm. This, of course, is not true in reality but aids in simplifying the demonstration. In this example, the path length is changed a total of 21.25 microns in delta path length steps of 53.12 nm for each collected image, for a total of 400 images.

The fringe packets for three points in the image are shown in FIGS. 13 through 15 below. In this regard, a fringe packet is a plot of the value captured at one specific pixel of image-capture array 807 over the series of all collected images, which in this case is 400 images. Each point in the plot represents a different delta optical path length between the segments of the two-piece split pattern of deformable mirror 825 used in this example. As deformable mirror 825 becomes phased at the 200th image, the fringe peaks to the zero burst and a diffraction-limited panchromatic image is acquired. The amount of modulation varies as a function of the contrast level in the object. At a point source, shown as 1303 in image 1304 of FIG. 13B, the modulation 1301 is highest as shown in the fringe packet plot of FIG. 13A. At an edge in the bright debris cloud, shown as 1312 in image 1313 of FIG. 14B, the modulation 1311 is somewhat less as shown in the fringe packet plot of FIG. 14A. Near the uniform bright center of Eta Carinae, shown as 1322 in image 1323 of FIG. 15B, the modulation 1321 is lower still due to the lack of contrast in this area, as shown in the fringe packet plot of FIG. 15A. The contrast is diminished in this area because the image is monochromatic. In actuality, the central star has a very different spectra than the surrounding area, and the spectral contrast is very large.

Figure 16A:
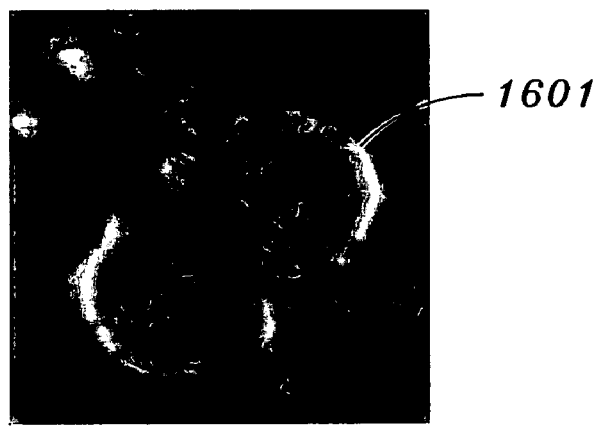
FIG. 16A is a depiction of the percent modulation of an astronomical object as measured by an embodiment of the spectrometer shown in FIG. 8.

The percent modulation of a fringe packet is determined by subtracting the fringe minimum value from the fringe maximum value, and dividing that result by the sum of the maximum and minimum values. This is a good metric to use for determining the expected spectral signal level within the image. FIG. 16A shows the modulation values for the Eta Carinae image used in the example discussed above. As expected, FIG. 16A shows that the point sources of image 1601 have the largest modulation, followed by the edges in the image. The modulation values range from 50 percent for the point sources to around 5 to 10 percent for the structure internal to the debris cloud in the image.

Figure 16B:
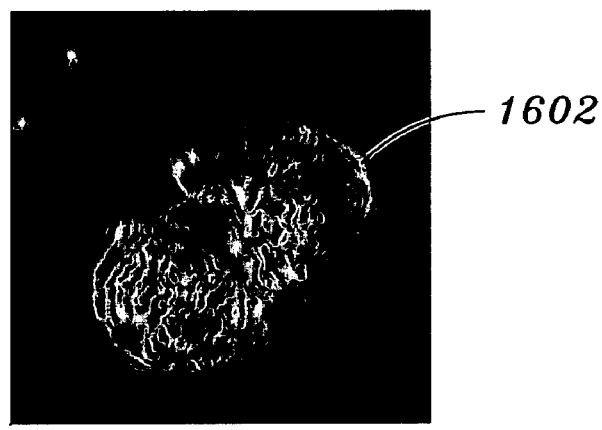
FIG. 16B is a depiction of a spectral frequency slice of an astronomical object at a first frequency as measured by an embodiment of the spectrometer shown in FIG. 8.
Figure 16C:
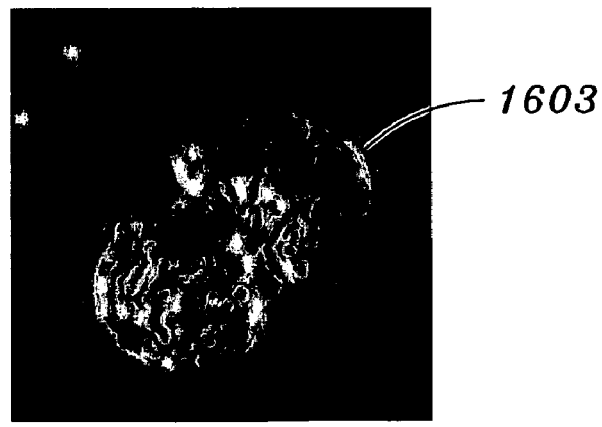
FIG. 16C is a depiction of a spectral frequency slice of an astronomical object at a second frequency as measured by an embodiment of the spectrometer shown in FIG. 8.

In the above-described examples, the fringe packets for each pixel in the image are windowed and then Fourier transformed to extract the spectral information. Each spectral band has an associated image in the resulting spectral data cube, which is the spectral data for each pixel of all images. FIGS. 16B and 16C show two slices of the spectral data cube for the above example using the monochromatic image of Eta Carinae. FIG. 16B is the 450 nm slice image (1602) and FIG. 16B (1603) is the 850 nm slice. The 850 nm image 1603 is somewhat blurred compared to the 450 nm image 1602. This result is to be expected since the point spread function is larger for 850 nm.

Figure 17:
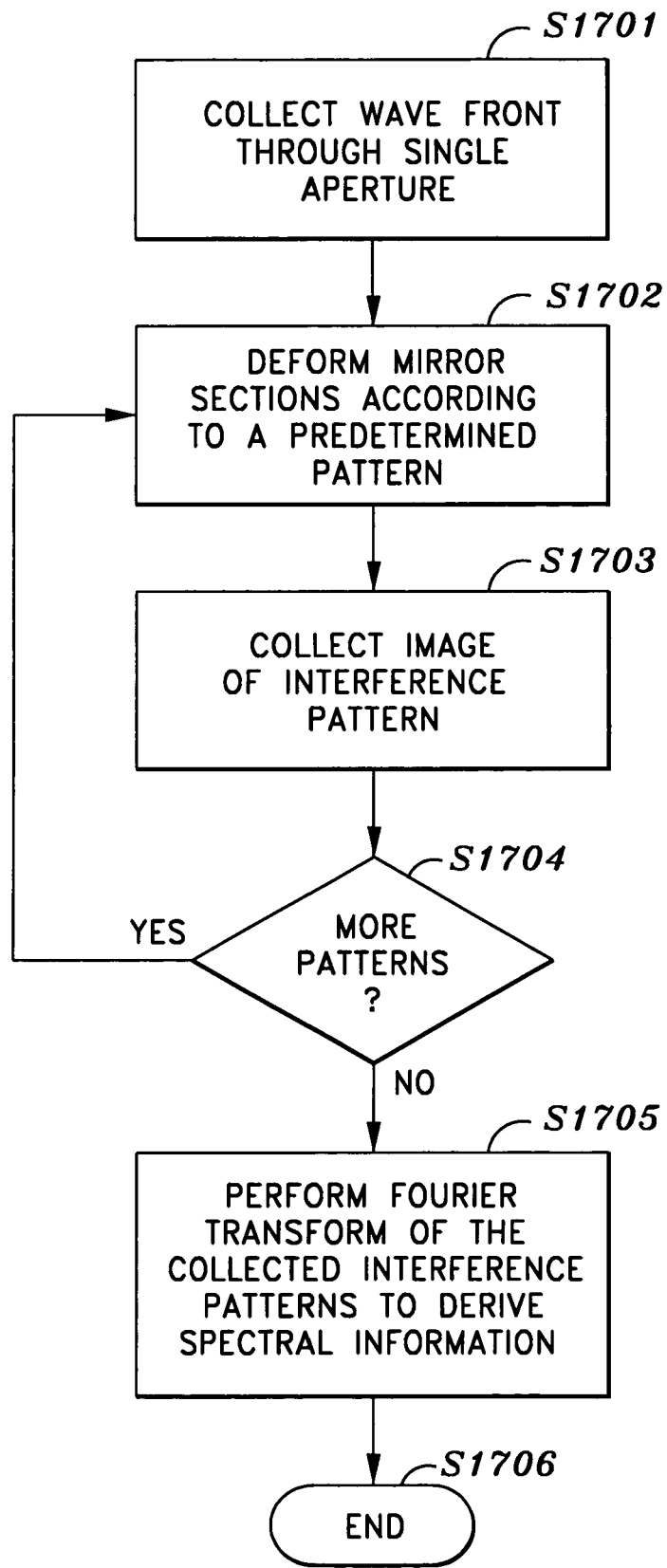
FIG. 17 is a high-level flowchart showing steps for deriving spectral information from a wavefront according to an embodiment of the spectrometer shown in FIG. 8.

FIG. 17 is a high-level flowchart showing steps for deriving spectral information from a wavefront, using spectrometer 800 of FIG. 8. It should be realized that the steps shown in FIG. 17 are not limiting on the invention as recited in the claims. Other techniques having fewer, substitute, and/or additional steps are within the purview of the invention and will be readily apparent to those of skill in the art. In step S1701, a wavefront portion 801a of wavefront 801 is collected by single-aperture collection device 820. In step 1702, one or more sections of deformable mirror 825 are deformed according to one of a series of predetermined deformation patterns to form an interference pattern at image plane 840. Next, in step S1703, the interference pattern at image plane 840 is captured by image-capture array 807.

It is then determined whether more interference pattern images are to be captured using different deformation patterns in step S1704. If more images are to be captured, then the process flow moves back to step S1702, upon which steps S1702 to S1704 are repeated for each deformation pattern. If no more images are to be captured, then the process flow moves to step S1705, in which the image information for all of the captured interference patterns is Fourier transformed to derive the spectral information for the wavefront. Specifically, image information collected by one or more pixels in an image-capture array may be Fourier transformed to extract spectral information. In this manner, high-resolution spectral information can be collected for objects ranging from point sources to more complex objects, such as terrestrial scenes, using a single-aperture FTIS spectrometer having a deformable mirror.

The invention has been described with respect to particular illustrative embodiments. It is to be understood that the invention is not limited to the above-described embodiments and that various changes and modifications may be made by those of ordinary skill in the art without departing from the spirit and scope of the invention described herein.

What is claimed is:

1. A spectrometer comprising:
    a collection device that is configured to collect a wavefront, the collection device having an entrance pupil;
    a deformable mirror disposed at an image of the entrance pupil, the deformable mirror having a plurality of sections, at least one of which is deformed to form interference patterns at an image plane of the collection device; and
    a Fourier transformation module configured to derive spectral information from the interference patterns.

2. The spectrometer of claim 1, wherein the at least one deformed section introduces a changed path length to a corresponding section of the wavefront so as to form an interference pattern.

3. The spectrometer of claim 1, wherein the deformable mirror is a deformable continuous face sheet mirror.

4. The spectrometer of claim 1, wherein the deformable mirror is comprised of a plurality of deformable mirror segments.

5. The spectrometer of claim 1, wherein the deformable mirror is comprised of a liquid crystal variable-phase retarding element.

6. The spectrometer of claim 1, wherein each of the plurality of sections of the deformable mirror is deformable in accordance with an input signal provided by a controller.

7. The spectrometer of claim 6, wherein the controller controls the input signals to deform the plurality of sections in accordance with one of a plurality of predetermined patterns.

8. The spectrometer of claim 1, wherein the Fourier transformation module is configured to Fourier transform the interference patterns to derive the spectral information.

9. The spectrometer of claim 8, wherein, to derive the spectral information, the Fourier transform module is configured to Fourier transform the interference patterns while the plurality of sections are consecutively deformed in accordance with a plurality of predetermined deformation patterns.

10. The spectrometer of claim 1, wherein the Fourier transformation module is configured to generate a spectrogram of the wavefront.

11. The spectrometer of claim 1, wherein the Fourier transformation module includes an image-capture array disposed at the image plane configured to capture images of the interference pattern.

12. The spectrometer of claim 11, wherein the image-capture array includes a charge-coupled device (CCD) array or a complimentary metal oxide (CMOS) array.

13. The spectrometer of claim 1, wherein the Fourier transformation module executes software code configured to perform the Fourier transformation.

14. The spectrometer of claim 1, wherein the Fourier transformation module includes an electronic hardware configured to perform the Fourier transformation.

15. The spectrometer of claim 1, wherein the collection device is a telescope.

16. The spectrometer of claim 1, wherein the spectrometer is configured to be deployed in space.

17. The spectrometer of claim 1, wherein each section of the deformable mirror is configured to collect a select portion of the wavefront, and the Fourier transformation module is configured to derive spectral information of the wavefront from interference patterns of the select portions of the wavefront.

18. A method for deriving a spectral information from a wavefront, the method comprising the steps of:
    collecting a wavefront with a collection device, the collection device having an entrance pupil;
    interfering the collected wavefront with a deformable mirror disposed at an image of the entrance pupil to form interference patterns at an image plane of the collection device, the deformable mirror having a plurality of sections, at least one of which is deformed; and
    Fourier transforming the interference patterns to derive spectral information for the wavefront.

19. The method of claim 18, further comprising the step of generating a spectrogram from the spectral information.

20. The method of claim 18, further comprising the step of collecting images of the interference pattern with an imaging array.

21. The method of claim 20, wherein Fourier transforming the interference patterns includes Fourier transforming interference patterns of the interference patterns collected by the imaging array.

22. The method of claim 20, wherein the imaging array is disposed at the image plane of the collection device.

23. The method of claim 18, wherein the sections of the deformable mirror are consecutively deformed in accordance with a plurality of predetermined deformation patterns.

24. The method of claim 23, wherein the Fourier transform module is configured to Fourier transform the interference patterns of the wavefront corresponding to each predetermined deformation pattern.

25. The method of claim 18, wherein the at least one deformed section introduces a changed path length to a corresponding section of the wavefront so as to form an interference pattern on the wavefront.

* * * * *

UNITED STATES PATENT AND TRADEMARK OFFICE
CERTIFICATE OF CORRECTION

PATENT NO. : 7,352,470 B1
APPLICATION NO. : 11/066384
DATED : April 1, 2008
INVENTOR(S) : Richard L. Kendrick et al.

It is certified that error appears in the above-identified patent and that said Letters Patent is hereby corrected as shown below:

IN THE DRAWINGS

Figure 4:
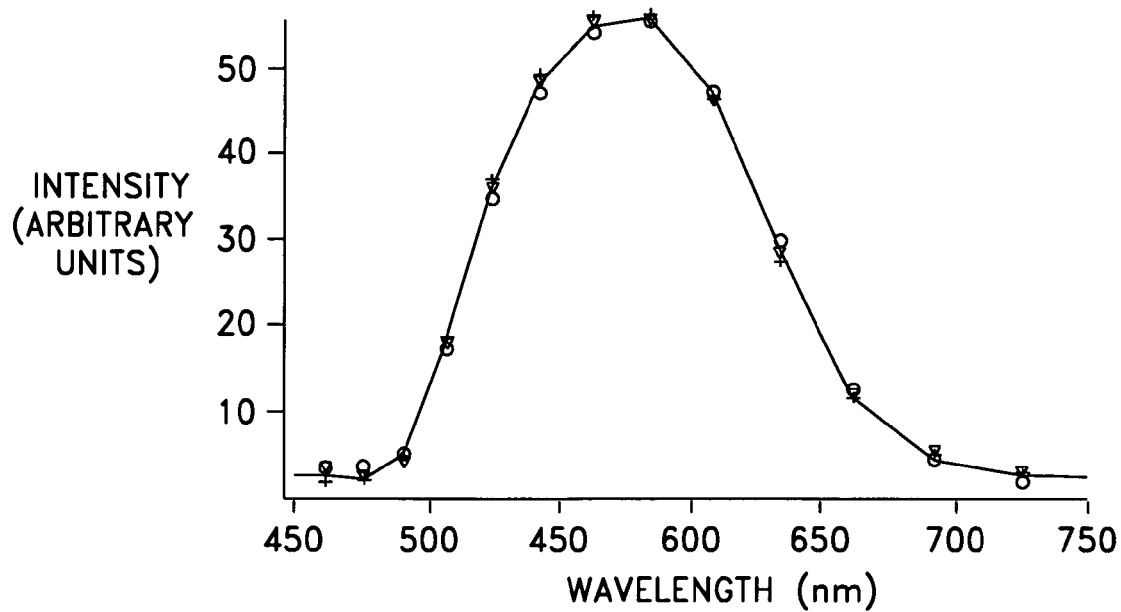
FIG. 4 shows a spectrogram according to an embodiment of the present invention.

In Figure 4, the X-axis tick labels, "450  500  450  600  650  700  750" should read --450  500  550  600  650  700  750--.

In Figure 8, in box 810, "CAMP. MODULE" should read --COMP. MODULE--.

In Claim 25, Column 14, line 24, "pattern on the wavefront." should read --pattern.--.

Signed and Sealed this

Eighteenth Day of November, 2008

JON W. DUDAS
*Director of the United States Patent and Trademark Office*